A. W. DAVIS.
MACHINE FOR FREEZING ICE CREAM.
APPLICATION FILED JUNE 2, 1909.
967,503.
Patented Aug. 16, 1910.
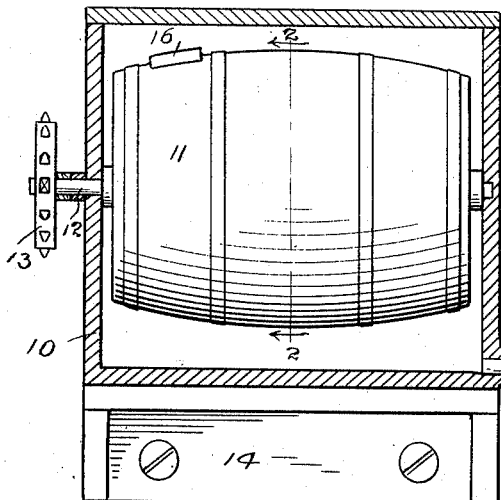
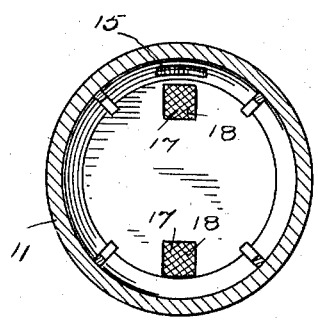
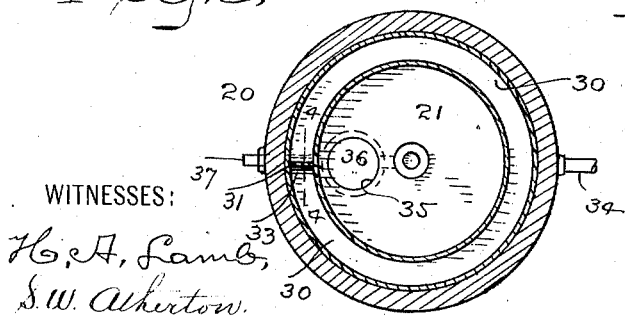
WITNESSES:
H. A. Lamb,
S. W. Atherton.
INVENTOR
Asa W. Davis
BY
N. M. Wooster
ATTORNEY

UNITED STATES PATENT OFFICE.

ASA W. DAVIS, OF BRIDGEPORT, CONNECTICUT.

MACHINE FOR FREEZING ICE-CREAM.

967,503.

Specification of Letters Patent.

Patented Aug. 16, 1910.

Application filed June 2, 1909. Serial No. 499,704.

*To all whom it may concern:*

Be it known that I, ASA W. DAVIS, a citizen of the United States, residing at Bridgeport, county of Fairfield, State of Connecticut, have invented an Improvement in Machines for Freezing Ice-Cream, of which the following is a specification.

This invention has for its object to provide a machine for freezing ice cream and similar uses, which shall be simple in construction, durable, not liable to get out of repair, relatively inexpensive to build, which will produce an exceedingly low temperature and will therefore freeze the cream quickly and which may be operated at a mere fraction of the cost of operating other machines of this character now in use.

With these and other objects in view I have devised the novel freezing machine of which the following description in connection with the accompanying drawing is a specification, reference characters being used to indicate the several parts.

Figure 1 is a view partly in elevation and partly in section, illustrating the construction and operation of my novel machine as a whole; Fig. 2 a section of the barrel on the line 2—2 in Fig. 1, looking in the direction of the arrows; Fig. 3 a section on the line 3—3 in Fig. 1, looking in the direction of the arrow; and Fig. 4 is a detail sectional view on the line 4—4 in Fig. 3.

10 denotes a tank in which a barrel 11 is mounted to rotate. One of the journals of the barrel, indicated specifically by 12, extends through the tank and is provided with means for imparting rotation thereto, as for example a crank, or a sprocket wheel 13 over which a driving sprocket chain (not shown) passes. The tank is secured at a suitable elevation above the other parts of the machine in any suitable manner, as for example by means of a bracket 14. The barrel is provided with an opening 15 for convenience in filling it with a freezing mixture as salt and ice, said opening being provided with a cover 16 which is secured in place in any suitable manner (not shown). At the ends of the barrel are openings 17 covered on the inner side with screens 18 which retain the ice and salt therein but permit the intensely cold brine formed by the melting of the ice and salt to escape freely. The brine passes from the tank by means of a pipe 19 to a circular freezing chamber 20. The outer wall of the freezing chamber and the wall and cover of the tank may be made of any suitable heat insulating or non-conducting material. The freezing chamber 21 is formed of a cylindrical receptacle provided with a single bottom wall and double side walls, a dasher 22 of any ordinary or preferred construction being mounted to rotate therein.

23 denotes the cover of the freezing chamber which is readily removable, is provided with an internal flange 24 to retain it in position and with a central hub 25 through which a journal 26 of the dasher passes. 27 denotes a shaft which detachably engages journal 26 and carries a sprocket wheel 28 or other suitable means for imparting rotation to the shaft and dasher. The upper end of shaft 27 is supported in a suitable frame 29 extending upward from the freezing chamber.

The vitally important feature of the freezing chamber is a series of annular brine cells 30 formed between the spaced apart side walls of the foregoing chamber. The walls of these annular brine cells are made of metal and any required number of cells may be used and placed one above the other, as clearly shown in Figs. 1 and 4. Each cell is provided with a vertical transverse wall 31 and with openings 33 in its upper and lower walls, the openings of each chamber being on opposite sides of the vertical transverse wall.

It will be noted that the wall of insulating material surrounds the bottom and side walls of the freezing chamber and projects over the topmost brine cell.

In use the barrel is charged with broken ice and salt and is caused to rotate. The intensely cold brine produced by the melting of the ice and salt passes from the tank to the upper circular brine cell which it enters through an opening 33 close to the vertical transverse wall. Before the brine can escape from this cell it must pass entirely around the cell and then pass out through an opening 33 on the opposite side of the transverse wall. The same thing is repeated in the superposed cells from top to bottom, the intensely cold brine passing into each circular cell through an opening contiguous to the transverse wall, then passing entirely around the cell to the opposite side of the transverse wall where it passes through an opening 33 into the cell below. It will be noted that the cross section of the brine cells is relatively small, consequently the entire series of cells is filled by a relatively small amount of intensely cold brine. Owing to the fact that brine cannot pass out of any cell until it has passed entirely around it, the passage through the cells is relatively slow and the cells are kept filled with constantly changing intensely cold brine with a very small consumption of ice and salt. Having reached the lower cell the brine passes out through an escape pipe 34 which is carried upward to sufficient height to retard without preventing the flow of brine through the cells.

The bottom of the freezing chamber is provided with an opening 35 for the removal of frozen cream, which is closed by a tapering plug 36 carried by an arm 37 hinged to the bottom of the tank and provided at its outer end with a cam 39. The plug is locked in place by means of a lever 40 having an opening 38 which receives the end of the arm freely and a cross piece 41 which engages the cam and forces the plug into the opening.

An important feature of the present invention is the ease with which the freezing chamber can be cleaned. Shaft 27 may be readily detached from the journal of the dasher and removed from the frame. The cover 23 is then removed and the dasher lifted out. Every part of the machine is thus readily detachable and is so perfectly simple in construction as to be readily cleansable.

Having thus described my invention I claim:

In a machine for freezing ice cream, the combination with a freezing chamber formed of a cylindrical receptacle provided with double spaced apart side walls united by a single integral bottom wall, a plurality of brine cells being formed between said spaced apart walls, each cell being provided with a transverse wall and openings in its upper and lower walls on opposite sides respectively of the transverse wall, and a jacket of insulating material surrounding the bottom and side walls of said freezing chamber and also the top wall of the topmost brine cell, of a removable cover for said freezing chamber, a dasher within said freezing chamber, means for supplying brine to said cells, an outlet opening extending through the bottom walls of said insulating jacket and said freezing chamber, and a closure for said opening.

In testimony whereof I affix my signature in presence of two witnesses.

ASA W. DAVIS.

Witnesses:
A. M. WOOSTER,
S. W. ATHERTON.